United States Patent
Simon

(10) Patent No.: US 8,064,448 B2
(45) Date of Patent: Nov. 22, 2011

(54) METHOD OF CORRESPONDENCE BETWEEN GROUP COMMUNICATION IDENTIFIERS AND MULTICAST ADDRESSES

(75) Inventor: Patrice Simon, Voisins le Bretonneux (FR)

(73) Assignee: EADS Secure Networks, Elancourt (FR)

( * ) Notice: Subject to any disclaimer, the term of this patent is extended or adjusted under 35 U.S.C. 154(b) by 160 days.

(21) Appl. No.: 12/438,363

(22) PCT Filed: Aug. 22, 2007

(86) PCT No.: PCT/EP2007/058741
§ 371 (c)(1),
(2), (4) Date: Feb. 23, 2009

(87) PCT Pub. No.: WO2008/025712
PCT Pub. Date: Mar. 6, 2008

(65) Prior Publication Data
US 2009/0290575 A1    Nov. 26, 2009

(30) Foreign Application Priority Data

Aug. 28, 2006 (FR) .................................. 06 53486

(51) Int. Cl.
*H04L 12/56* (2006.01)
(52) U.S. Cl. ........ 370/390; 370/392; 370/432; 370/474; 709/245
(58) Field of Classification Search .................. 370/389, 370/390, 392, 400, 401, 432, 475; 709/245
See application file for complete search history.

(56) References Cited

U.S. PATENT DOCUMENTS

| 6,078,954 | A | 6/2000 | Lakey et al. | |
| 6,141,347 | A * | 10/2000 | Shaughnessy et al. | 370/390 |
| 6,157,622 | A * | 12/2000 | Tanaka et al. | 370/312 |
| 6,246,696 | B1 * | 6/2001 | Yamaguchi et al. | 370/475 |
| 6,336,119 | B1 * | 1/2002 | Banavar et al. | 1/1 |
| 6,697,349 | B2 * | 2/2004 | Mathis et al. | 370/338 |
| 6,987,764 | B2 * | 1/2006 | Hsu | 370/390 |
| 7,221,660 | B1 * | 5/2007 | Simonson et al. | 370/312 |
| 7,633,926 | B1 * | 12/2009 | Sethi et al. | 370/349 |
| 2003/0187926 | A1 * | 10/2003 | Karjanlahti | 709/204 |
| 2005/0066055 | A1 | 3/2005 | Park et al. | |

FOREIGN PATENT DOCUMENTS

| EP | 1303107 | 4/2003 |
| EP | 1679856 | 7/2006 |

* cited by examiner

*Primary Examiner* — Hassan Phillips
*Assistant Examiner* — Duc Duong
(74) *Attorney, Agent, or Firm* — Lowe Hauptman Ham & Berner, LLP

(57) ABSTRACT

An identifier (IDp) designates a group of terminals accessible via the network (RP) by packets having a multicast address as destination address. An equipment (EIm) between the network and a terminal (Tn) belonging to a group calculates the multicast address of the group using a function depending on the identifier (IDp) of the group each time that a packet including a message transmitted by the terminal is to be transmitted to the network. The equipment also calculates a group identifier (IDp) using a function depending on a multicast address extracted each time that a packet transmitted from the network is received by the equipment in order to transmit a message content extracted from the packet to be received by the terminal if the calculated group identifier is identical to the identifier of the group to which the terminal belongs. No table of mappings between the identifiers of the groups and the multicast addresses is stored in the equipment.

18 Claims, 2 Drawing Sheets

US 8,064,448 B2

Figure 1:
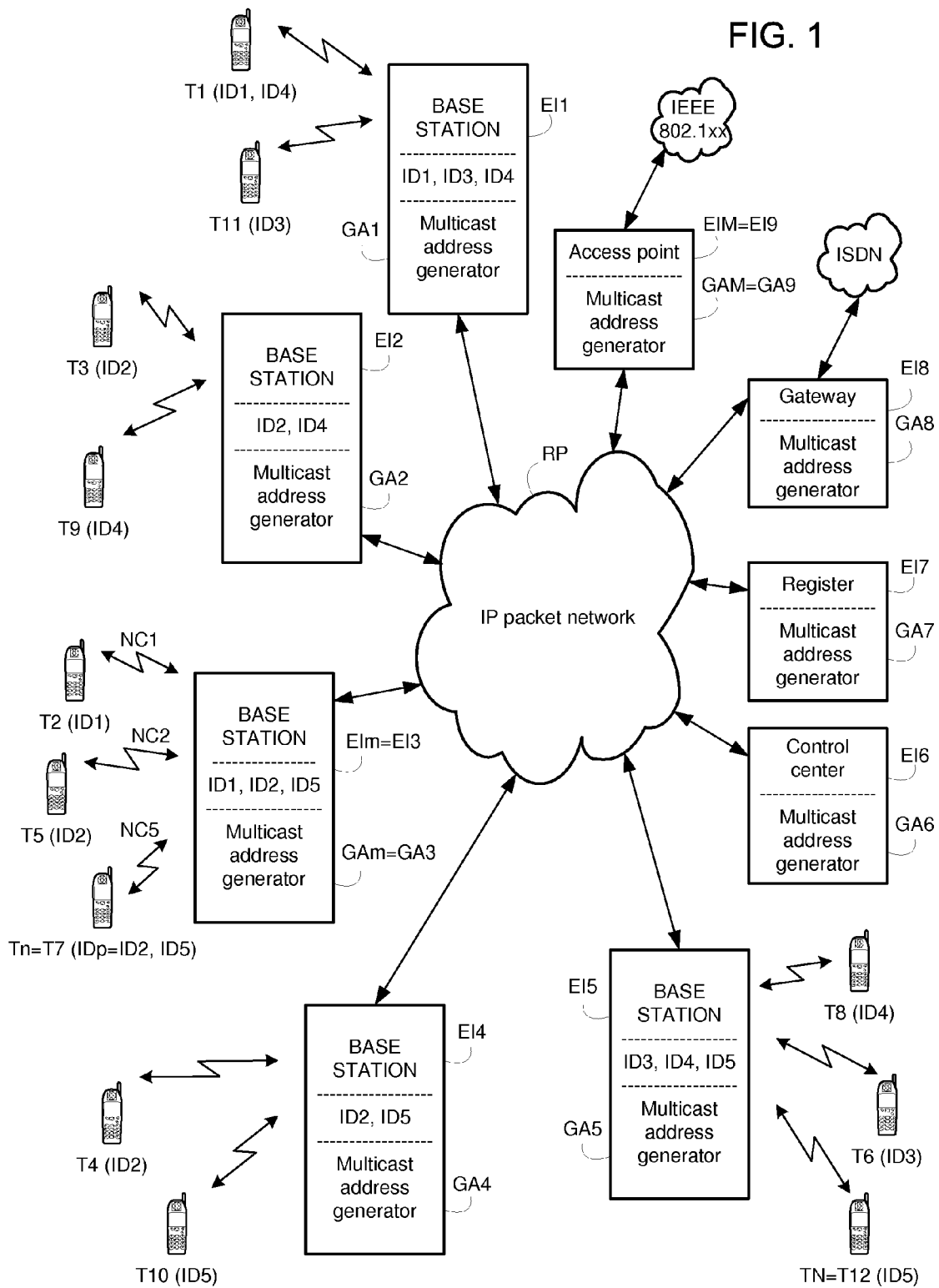

METHOD OF CORRESPONDENCE BETWEEN GROUP COMMUNICATION IDENTIFIERS AND MULTICAST ADDRESSES

RELATED APPLICATIONS

The present application is based on, and claims priority from, FR Application Number 0653486, filed Aug. 28, 2006, and PCT Application Number PCT/EP07/058741, filed Aug. 22, 2007, the disclosures of which are hereby incorporated by reference herein in their entireties.

The present invention is generally concerned with the exchange of voice packets between fixed or mobile terminals logically assembled into groups and serviced by intermediate equipments via a private packet network using the Internet Protocol (IP).

It is known that, in private radio communication systems, fixed or mobile terminals communicate with each other via an infrastructure network that consists of intermediate equipments, such as base stations, registers or gateways to external networks or control centers, and a communication network, such as an IP packet network.

The fixed and mobile terminals communicate firstly with an intermediate equipment via cable or radio link, after which those intermediate equipments in turn communicate with each other via the communication network.

It is also known to unite these fixed and mobile terminals into groups in these private radio communication systems in order for any terminal that is a member of a group to be able to transmit voice messages to other terminals that are members of the group via the infrastructure network and to receive voice messages from any terminal belonging to the group via the same infrastructure network.

One solution for addressing packets transmitted by an intermediate equipment across the communication network and including messages from a source terminal connected to that intermediate equipment and belonging to a group to intermediate equipments of which are connected receiver terminals belonging to the same group consists in using unicast mode destination addresses. In this case, the intermediate equipment of the source terminal copies each message from the source terminal into as many packets as there are intermediate equipments to which the receiver terminals of the group are connected.

A variant consists in using an intermediate device, connected to the communication network, which receives in unicast mode the content of packets coming from an intermediate equipment to which a source terminal is connected, then replicates and finally forwards in unicast mode the content of the packet to all the intermediate equipments to which the receiver terminals of the group are connected.

As each receiver terminal is also a source terminal in the group, the number of copied packets transmitted by intermediate equipments to multiple intermediate equipments becomes very high and may lead to saturation of the traffic in the packet network, as a plurality of packets with the same message can be routed via the same connection in the packet network.

A solution for removing these drawbacks consists in transmitting each packet in multicast IP transmission mode from an intermediate equipment to which a source terminal of a group is connected to intermediate equipments to which receiver terminals belonging to the group are connected. The intermediate equipment to which the source terminal is connected transmits the packets containing the message from the source terminal to the packet network to a multicast address specific to the group. Multicast routers in the packet network forward these packets with the message in accordance with an optimum replication of a multicast distribution tree the branches whereof are the intermediate equipments to which receiver terminals belonging to the group are connected, which reduces the bandwidth necessary for exchanges of messages in packets between the terminals of the groups in the packet network.

A controller is provided in an intermediate equipment to maintain a table of correspondences between group identifiers and multicast addresses. If a terminal affiliated to at least one group is connected to the intermediate equipment, the mobile terminal transmits an affiliation message including the identifier of the group. The controller causes the respective multicast address read in the table of correspondences stored in the intermediate equipment to correspond to that group identifier. The intermediate equipment can then transmit packets with the respective read multicast address as the destination address to other intermediate equipments with which mobile terminals of the group are affiliated.

Thus each intermediate equipment, or each terminal, contains the correspondences between the identifiers of the groups and the multicast addresses, which occupies memory space in the intermediate equipment, or the terminal, and makes the table of correspondences readily available.

An object of this invention is to use multicast addressing to transmit packets to terminals belonging to groups but without storing tables of correspondences between group identifiers and multicast addresses in the intermediate equipments, the mobile terminals, the fixed terminals or elsewhere.

To achieve this object, an equipment between a packet network and at least one terminal belonging to a group of terminals, said group being designated by an identifier and including terminals accessible via the network by packets having a multicast address as destination address, is characterized in that it comprises means for calculating the multicast address of the group using a function depending on the identifier of the group each time that a packet including a message transmitted by the terminal is to be transmitted to the network.

An equipment may comprise, alone or in combination with the foregoing calculation means, means for calculating a group identifier using a function depending on a multicast address extracted each time that a packet transmitted from the network is received by the equipment. The equipment is then adapted to transmit a message content extracted from the packet to be received by the terminal belonging to the group of terminals if the calculated group identifier is identical to the identifier of the group to which the terminal belongs.

The invention relates also to an arrangement of first and second equipments between a packet network and terminals belonging to a group of terminals, said group being designated by an identifier and including terminals accessible via the network by packets having a multicast address as destination address. The arrangement is characterized in that the first equipment comprises means for calculating the multicast address of the group using a function depending on the identifier of the group each time that a packet including a message transmitted by a terminal belonging to the group of terminals and connected to the first equipment is to be transmitted to the network, and the second equipment comprises means for calculating a group identifier using a function depending on a multicast address extracted each time that a packet transmitted from the network is received by the second equipment in order to transmit a message content extracted from the received packet to a terminal belonging to the group of terminals and connected to the second equipment if the calculated group identifier is identical to the identifier of the group to which the terminal connected to the second equipment belongs.

The first equipment and second equipment can be united into one equipment.

The function of the first equipment is a biunivocal function so as to bijectively associate identifiers of groups with multicast addresses. The function of the second equipment is a biunivocal function so as to bijectively associate multicast addresses with group identifiers. The function of the second equipment is the reciprocal of the function of the first equipment. Using two reciprocal functions in all the equipments avoids maintaining tables of mappings between the identifiers of the groups and the multicast addresses in the equipments.

Thus to each group there corresponds one and only one group identifier and one and only one multicast address. According to the invention, the correspondence is established on the fly each time that there is a message to be transmitted from a terminal of a group to the packet network and each time that there is a message to be transmitted from the packet network to the terminals of a group.

The function of the first equipment may depend directly on the identifier of the group and, conversely, the identifier of the group may depend directly on the function of the second equipment, i.e. the function of the multicast address of the group. The function of the first equipment may be such that one of the last two bytes of the multicast address of the group is equal to the integer portion of the quotient on dividing the identifier of the group by a power of 2, for example at most equal to the number of bits in a byte, and the other byte is equal to the remainder of the division.

The invention relates also to a multicast addressing method
relating to the first equipment and comprising calculating the multicast address of the group using a function depending on the identifier of the group each time that a packet including a message transmitted by the terminal is to be transmitted to the network, and/or
relating to the second equipment and comprising calculating a group identifier using a function depending on a multicast address extracted each time that a packet transmitted from the network is received by the second equipment.

The method may further comprise in the second equipment transmitting a message content extracted from the packet received by the second equipment to a terminal belonging to the group of terminals and connected to the second equipment if the calculated group identifier is identical to the identifier of the group to which the terminal connected to the second equipment belongs.

The invention relates further to computer programs adapted to be executed in the first equipment and the second equipment, respectively, and to a combination of first and second computer programs adapted to be executed in first and second equipments, respectively. These programs comprise instructions that execute steps of the corresponding variants of the method of the invention set out hereinabove.

Figure 2:
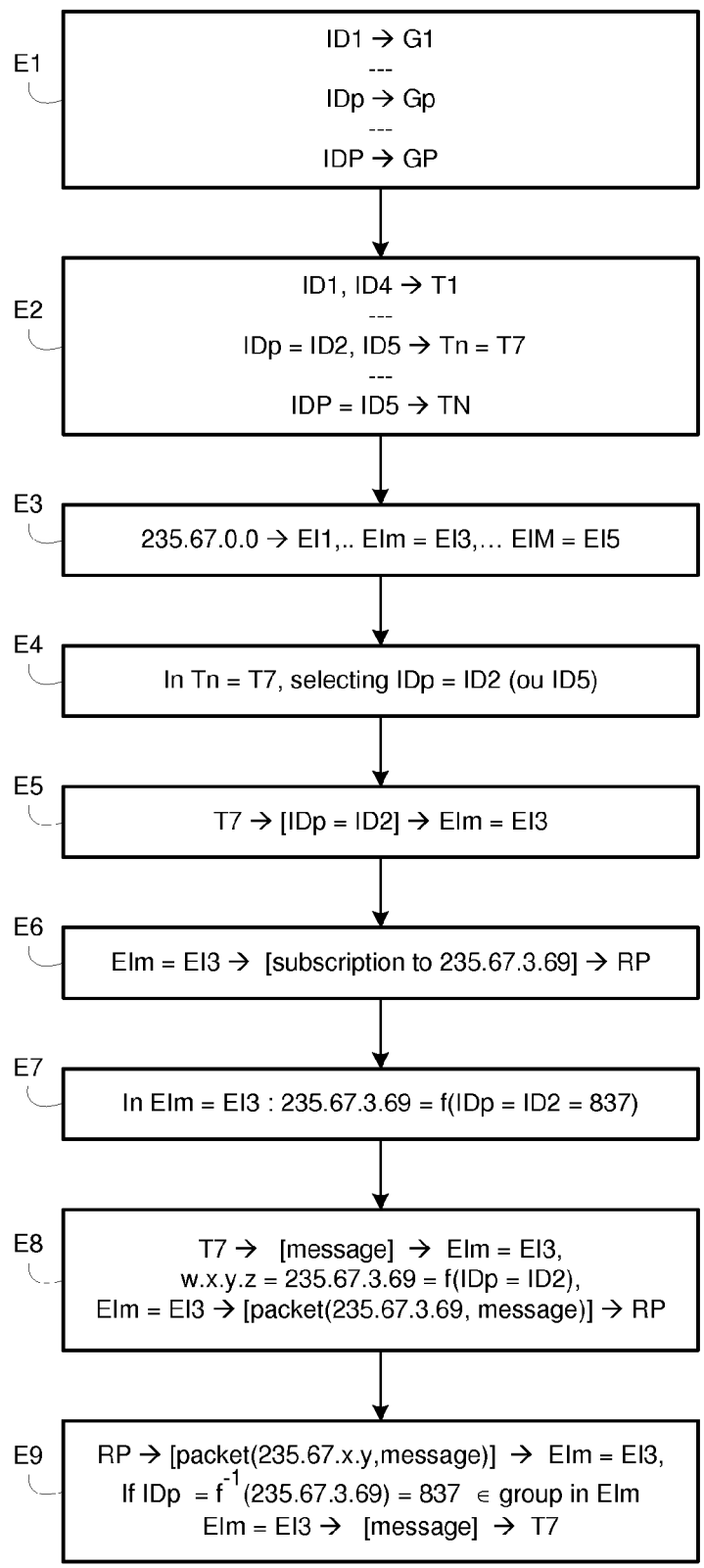

Other features and advantages of the present invention will become more clearly apparent on reading the following description of embodiments of the invention given by way of nonlimiting example with reference to the corresponding appended drawings, in which:

FIG. 1 is a schematic block diagram of a private radio communication system for mobile and fixed terminals including intermediate equipments according to the invention; and FIG. 2 is a flowchart of a multicast addressing method according to the invention.

Referring to FIG. 1, a radio communication system, for example for mobile terminals and of the TETRA, TETRAPOL or P25 professional land mobile radio type, comprises a connectionless telecommunication network RP of the packet network type conforming to the Internet Protocol (IP), mobile terminals, fixed terminals and intermediate equipments. For example, in FIG. 1 are represented M=9 intermediate equipments such as five base stations EI1 to EI5 which are radio sites connected to mobile terminals via radio links, a control center EI6 for operators defining communication groups and/or monitoring group communications, at least one voice and data communication register EI7, at least one gateway EI8 to an external ISDN (Integrated Services Digital Network) servicing fixed terminal installations and/or terminals, and at least one access point EIM=EI9 of a network conforming to the IEEE 802.1xx (802.11a, 802.11b or 802.11g) standard and satisfying the WiFi (Wireless Fidelity) certification label, communicating with mobile terminals adapted to this type of network. To each intermediate equipment there may be connected one or more terminals that are mobile or fixed, depending on the type of intermediate equipment.

For example, in order not to overload FIG. 1, there are shown only N=12 mobile terminals T1 to TN=T12 that are connected to the base stations EI1 to EI5 and which are referred to hereinafter.

The packet network RP contains routers operating in IP multicast transmission mode whereby an IP packet having as its destination address an IP multicast address is broadcast from a sender/source intermediate equipment to receiver/destination intermediate equipments to which terminals belonging to a respective group are connected. A group unites terminals that bidirectionally exchange mainly voice for the users of those terminals to converse with each other and also data. In practice, calls are set up in half-duplex mode, a speaker user of the group speaking and the other users of the group listening to the speaker user. The participants of a group are generally mobile terminal users. However, participants of a group may in particular and more generally be users of mobile or fixed terminals, such as operators of the control center EI6, one or more call registers by way of virtual listener users, one or more users of terminals external to the private radio communication system and serviced by one or more gateways EI8 of the ISDN or other telecommunication network, and one or more users of terminals external to the private radio communication system and serviced by one or more access points EI9 of a network conforming to the IEEE 802.1xx standard.

If addresses in the network RP are coded on four bytes, in accordance with version 4 of the Internet Protocol (IPv4), signaling subscription/unsubscription of an intermediate equipment to the multicast router(s) of the network RP is managed in accordance with the Internet Group Management Protocol (IGMP), for example.

Each group can include a single terminal or a plurality of terminals that can be connected to one or more intermediate equipments at a given time. One or more terminals of a group can be terminals external to the private radio communication system and serviced in particular by the ISDN gateway EI8 or by the access point EI9 of the IEEE 802.1xx network.

Initially, for example, the mobile terminals T1 to TN=T12 are divided into P=5 communication groups G1 to GP=G5 respectively designated by group identifiers ID1 to ID5. The group G1 includes at least the mobile terminals T1 and T2 able to communicate with each other via the base stations EI1 and EI3 and radio links, respectively. The group G2 includes at least the mobile terminals T3, T4, T5 and T7 able to communicate with each other via the base stations EI2, EI4, EI3 and EI3 and radio links, respectively. The group G3 includes at least the mobile terminals T6 and T11 able to communicate with each other via the base stations EI5 and EI1 and radio links, respectively. The group G4 includes at least the mobile terminals T1, T8 and T9 that can communicate with each other via the base stations EI1, EI5 and EI2 and radio links, respectively. The group GP=G5 includes at least the mobile terminals T10, T7 and T12 able to communicate with each other via the base stations EI4, IE3 and EI5 and radio links, respectively.

Usually, before a terminal Tn, where $1 \leq n \leq N$, is commissioned, non-volatile memory, for example of EEPROM or Flash type, of that terminal is programmed with at least one group identifier IDp, where $1 \leq p \leq P$, so as to authorize the user of the terminal to be affiliated only with groups designated by the group identifier(s). The fixed terminals can also be programmed in the same way.

A terminal programmed in this way is a member of a group Gp and then becomes a sender and/or a receiver of voice and/or data only if the user of the terminal has selected the identifier of that group IDp from those with which it is initially authorized to be affiliated.

Following selection of the group by the user, the terminal transmits a request for affiliation with the group to the intermediate equipment to which it is connected. This request contains the group identifier IDp.

The intermediate equipment then calculates the multicast address corresponding to the identifier IDp using the method of the invention.

The intermediate equipment then subscribes to the local router in the network RP adjoining it. Through well known mechanisms specific to multicast management in IP packet networks, the routers of the network RP cause the topology of the multicast distribution tree specific to the multicast address to evolve so that this intermediate equipment forms part of this multicast distribution tree.

Then, when a voice and/or data message to a group is transmitted to the intermediate equipment by the terminal, that intermediate equipment includes the voice and/or data message in IP packets having the address of the intermediate equipment as the source address and the multicast address of the group Gp as the destination address. The IP packets structured in this way are transmitted to the local router in the network RP that adjoins the intermediate equipment EIm and that broadcasts them through the routers of the network RP in accordance with a multicast distribution tree to all the other intermediate equipments to each of which one or more terminals belonging to the group Gp are connected. Simultaneously, each intermediate equipment is listening out for packets that are transmitted to it by the adjacent local router, in order to filter them and to detect therein an IP multicast address designating the group, and to extract therefrom a message to be transmitted to one or more terminals connected to that intermediate equipment and belonging to the group Gp.

According to the invention, each intermediate equipment, like the base station EIm=EI3, with $1 \leq m \leq M$, comprises multicast address calculation software means for calculating the IP multicast address of a group Gp to which a terminal Tn connected to the intermediate equipment EIm is affiliated, depending on the identifier IDp of the group Gp. In the embodiment shown in FIG. 1, the multicast address calculation software means includes a multicast address generator GAm.

The generator GAm=GA3 calculates a multicast address depending on the identifier of the group IDp read by the processor of the intermediate equipment EIm using a predetermined first function f. The function f is a biunivocal function so that for each multicast address a unique group identifier IDp is generated in response to any message transmitted by a terminal connected to the intermediate equipment EIm and belonging to the group Gp designated by the group identifier IDp.

For example, if the multicast address is coded on four bytes according to the IPv4 protocol, namely w.x.y.z., the function f divides the identifier IDp by a power of 2 equal to the number of bits in a byte, the result of which is divided between the last two bytes of the multicast address as follows:

$$IDp = 256\ y + z, \text{ with } 0 \leq IDp \leq 256 \times 256 - 1,$$

i.e. y=integer part (IDp/256) where $0 \leq y \leq 255$ and z=IDp modulo (256) where $0 \leq z \leq 255 = 2^8 - 1$.

The multicast addresses w.x.y.z. belong to the public part of the class D for multicasting in an IP network, begin with the binary sequence "1110" and lie between 224.0.1.0 and 238.255.255.255. In practice, for a private radio communication system for terminals in accordance with the invention in which the group identifiers vary over a range from 0 to 65535, the multicast addresses w.x.y.z. have in common constants for integer numbers w and x and run, for example, from 235.67.0.0 to 235.67.255.255, i.e. 256×256=65536 possible multicast addresses.

To give another example, and in the same way, for a private radio communication system for terminals in accordance with the invention in which the group identifiers vary over a range from 0 to 255, the multicast addresses w.x.y.z. have in common constants for integer numbers w, x and y and range for example from 235.67.35.0 to 235.67.35.255, i.e. 256 possible multicast addresses.

In the other transmission direction, the generator GAm also contains a function $f^{-1}$ that is the reciprocal of the function f to be applied to the destination multicast address, e.g. to the last two bytes of the multicast address, extracted from any IP packet received by the intermediate equipment EIm to calculate the identifier of the group IDp.

All the generators in the intermediate equipments have in common the functions f and $f^{-1}$.

Referring to FIG. 2, the multicast addressing method of the invention relating to an intermediate equipment such as a base station EIm=EI3 to which are connected mobile terminals Tn such as the mobile terminal T2 of the group G1, the mobile terminal T5 of the group G2 and the mobile terminal T7 of the groups G2 and G5, comprises steps E1 to E9.

Initially, in the step E1, group identifiers ID1 to IDP lying between 0 and 65535 are assigned to the groups G1 to GP. As a function of the assignments of each user of a mobile terminal Tn, one or more group identifiers are written into the memory of the terminal in the step E2 and designate all the groups that the user of the terminal Tn is authorized to select. Then, in the step E3, the address, equal to 235.67.0.0, for example, is written into memory in the intermediate equipments EI1 to EIM.

In the step E4, the user of one of the terminals connected to the base station EIm=EI3, for example the mobile terminal Tn=T7, selects via the keypad or the screen of the mobile terminal one of the identifiers ID2 and ID5 of the groups G2 and G5 with which the mobile terminal Tn=T7 is authorized to communicate. After validation of the selected group identifier, for example the group identifier IDp=ID2 equal to 837, for example, the mobile terminal Tn=T7 transmits an affiliation request containing the selected group identifier ID2 to the base station EIm=EI3 in the step E5.

In the step E6, the base station EIm=EI3 calculates the multicast address corresponding to the group identifier ID2. More precisely, the address generator GAm=GA3 applies the predetermined biunivocal function f to the group identifier ID2=837 in order to generate the multicast address 235.67.3.69 derived from the calculation 837=3×256+69.

In the step E7, the base station EIm=EI3 then transmits to the network RP a subscription request at the multicast address 235.67.3.69. The network RP is then autoconfigured to add the base station EIm=EI3 to the multicast tree corresponding to the multicast address 235.67.3.69.

In steps E8, each time that the user of the mobile terminal Tn=T7 begins to speak or wishes to transmit data, each of the messages transmitted by the terminal is encapsulated in an IP packet the multicast address whereof is calculated by the base station EIm=EI3. More precisely, for each packet encapsulating a message to be transmitted, the address generator GA3 applies the predetermined biunivocal function f to the group identifier ID2=837 in order to generate the multicast address 235.67.3.69.

Simultaneously with the steps E8, in steps E9, the base station EIm=EI3 detects among the IP packets that it receives, IP packets with the destination multicast address 235.67.3.69 liable to include a message transmitted by an intermediate equipment to which is connected a terminal affiliated to the group G2 the identifier ID2=837 whereof has been selected.

If the destination address extracted from each packet received from the network RP is a multicast address of the type 235.67.y.z, the address generator GA3 in the base station EIm=EI3 applies the reciprocal function $f^{-1}$ to the extracted multicast address, particularly to the last two bytes of the multicast address, to calculate a group identifier, for example IDp=837. If the calculated identifier corresponds to a group with which at least one terminal connected to the base station EIm is affiliated, then the processor of the base station EIm=EI3 extracts the content of the message encapsulated in the received IP packet so that the radio interface of the base station EI3 can send it to the terminals affiliated to the group GP identified by IDp=837 and that are connected to it. The message sent is received by the mobile terminal T7 and possibly by any other terminal such as the terminal T5 belonging to the group G2 and connected to the base station EIm=EI3.

Thus no mapping between the group identifier IDp and a multicast address is stored in an intermediate equipment or in the fixed or mobile terminals.

The invention described here relates to an equipment, an arrangement of first and second equipments, a multicast addressing method relating to an equipment and a multicast addressing method relating to first and second equipments. In one embodiment, the steps of each method of the invention are determined by instructions of a computer program incorporated into an equipment. The program includes program instructions which, when said program is executed in an equipment, the operation whereof is then controlled by executing the program, executes steps of the method according to the invention.

Consequently, the invention applies equally to a computer program, in particular a computer program stored on or in a computer-readable information medium and any data processing device adapted to implement the invention. That program may use any programming language and can take the form of source code, object code or an intermediate code between source code and object code such as in a partially compiled form, or any other form that may be desirable for implementing the method according to the invention.

The information medium may be any entity or device capable of storing the program. For example, the medium can include a storage medium or a recording medium on which the computer program according to the invention is stored, such as a ROM, for example a CD ROM or a microelectronic circuit ROM, or a USB key, or magnetic storage means, for example a diskette (floppy disk) or a hard disk.

The invention claimed is:

1. An equipment between a packet network and at least one terminal belonging to a group of terminals, said group being designated by an identifier and including terminals accessible via said network by packets having a multicast address as destination address, said equipment comprising a generator for calculating said multicast address of said group using a function depending on said identifier of said group each time that a packet including a message transmitted by said terminal is to be transmitted to said network.

2. An equipment according to claim 1, wherein said function is such that one of the last two bytes of said multicast address of said group is equal to the integer portion of the quotient of the division relating to said identifier of said group by a power of 2, and the other byte is equal to the remainder of said division.

3. The equipment according to claim 1, wherein the equipment is included in a base station connected via radio link to at least a terminal that is mobile.

4. An equipment between a packet network and at least one terminal belonging to a group of terminals, said group being designated by an identifier and including terminals accessible via said network by packets having a multicast address as destination address, said equipment comprising a generator for calculating a group identifier using a function depending on a multicast address extracted each time that a packet transmitted from said network is received by said equipment.

5. An equipment according to claim 4, adapted to transmit a message content extracted from said packet to be received by said terminal belonging to said group of terminals if the calculated group identifier is identical to said identifier of the group to which said terminal belongs.

6. An equipment according to claim 4, wherein the function is applied to the last two bytes of said multicast address.

7. An equipment according to claim 4, included in a base station connected via radio link to at least a terminal that is mobile.

8. An arrangement of first equipment and second equipment between a packet network and terminals belonging to a group of terminals, said group being designated by an identifier and including terminals accessible via said network by packets having a multicast address as destination address,
    said first equipment comprising a generator for calculating said multicast address of said group using a function depending on said identifier of said group each time that a packet including a message transmitted by a terminal belonging to said group of terminals and connected to said first equipment is to be transmitted to said network, and
    said second equipment comprising a generator for calculating a group identifier using a function depending on a multicast address extracted each time that a packet transmitted from said network is received by said second equipment in order to transmit a message content extracted from the received packet to a terminal belonging to said group of terminals and connected to said second equipment if the calculated group identifier is identical to said identifier of said group to which said terminal connected to said second equipment belongs.

9. An arrangement according to claim 8, wherein said first equipment and second equipment are united into one equipment.

10. An arrangement according to claim 8, wherein
    said function of said first equipment is one-to-one mapping, said function of said second equipment is one-to-one mapping, and said function of said second equipment is the reciprocal of said function of said first equipment.

11. A multicast addressing method relating to an equipment between a packet network and at least one terminal belonging to a group of terminals, said group being designated by an identifier and including terminals accessible via said network by packets having a multicast address as destination address, said method comprising calculating, by said equipment, said multicast address of said group using a function depending on said identifier of said group each time that a packet including a message transmitted by said terminal is to be transmitted to said network.

12. A multicast addressing method relating to an equipment between a packet network and at least one terminal belonging to a group of terminals, said group being designated by an identifier and including terminals accessible via said network by packets having a multicast address as destination address, said method comprising calculating, by said equipment, a group identifier using a function depending on a multicast address extracted each time that a packet transmitted from said network is received by said equipment.

13. A method according to claim 12, comprising transmitting a message content extracted from the packet received to said terminal belonging to said group of terminals if the calculated group identifier is identical to said identifier of said group to which said terminal belongs.

14. A multicast addressing method relating to first and second equipments between a packet network and terminals belonging to a group of terminals, said group being designated by an identifier (and including terminals accessible via said network by packets having a multicast address as destination address, said method comprising in said first equipment, calculating said multicast address of said group using a function depending on said identifier of said group each time that a packet including a message transmitted by a terminal belonging to said group of terminals and connected to said first equipment is to be transmitted to said network, and in said second equipment, calculating a group identifier using a function depending on a multicast address extracted each time that a packet transmitted from said network is received by said second equipment, and transmitting a message content extracted from the received packet to a terminal belonging to said group of terminals and connected to said second equipment if the calculated group identifier is identical to said identifier of said group to which said terminal connected to said second equipment belongs.

15. A non-transitory computer-readable information medium comprising a computer program adapted to be executed in an equipment between a packet network and at least one terminal belonging to a group of terminals, said group being designated by an identifier and including terminals accessible via said network by packets having a multicast address as destination address, said program including program instructions which execute when the program is loaded into and executed in said equipment calculating the multicast address of the group using a function depending on the identifier of the group each time that a packet including a message transmitted by said terminal is to be transmitted to said network.

16. A non-transitory computer-readable information medium comprising a computer program adapted to be executed in an equipment between a packet network and at least one terminal belonging to a group of terminals, said group being designated by an identifier and including terminals accessible via said network by packets having a multicast address as destination address, said program including program instructions which execute when the program is loaded into and executed in said equipment calculating a group identifier using a function depending on a multicast address extracted each time that a packet transmitted from said network is received by said equipment.

17. The non-transitory computer-readable information medium comprising a computer program according to claim 16, comprising transmitting a message content extracted from the packet received to said terminal belonging to the group of terminals if the calculated group identifier is identical to said identifier of said group to which said terminal belongs.

18. A non-transitory computer-readable information medium comprising a combination of first computer program and second computer program adapted to be respectively executed in first equipment and second equipment between a packet network and terminals belonging to a group of terminals, said group being designated by an identifier and including terminals accessible via said network by packets having a multicast address as destination address, said first program including program instructions which, when said first program is loaded into and executed in said first equipment, executes calculating the multicast address of said group using a function depending on the identifier of said group each time that a packet including a message transmitted by a terminal belonging to said group of terminals and connected to said first equipment is to be transmitted to said network, and said second program including program instructions which, when said second program is loaded into and executed in said second equipment, executes calculating a group identifier using a function depending on a multicast address extracted each time that a packet transmitted from said network is received by said second equipment, and transmitting a message content extracted from the packet received to a terminal belonging to said group of terminals and connected to said second equipment if the calculated group identifier is identical to said identifier of said group to which said terminal connected to said second equipment belongs.

* * * * *